United States Patent [19]

Tomioka et al.

[11] 4,179,256

[45] Dec. 18, 1979

[54] VULCANIZATION APPARATUS FOR A CONTINUOUS LENGTH OF ARTICLE OF RUBBER, PLASTICS OR THE LIKE MATERIAL

[75] Inventors: Shoji Tomioka; Toshiaki Nakao; Hisatsugu Nakamura, all of Kitakyushu; Nobuyoshi Mine, Fukuoka; Katsuo Yamamoto, Ichihara; Seiji Fukushima, Ichihara; Akira Nogami, Ichihara, all of Japan

[73] Assignee: Furukawa Electric Co., Ltd., Marunouchi, Japan

[21] Appl. No.: 933,872

[22] Filed: Aug. 15, 1978

[51] Int. Cl.² .................. B29H 5/28; B29C 25/00
[52] U.S. Cl. .................. 425/71; 264/347; 425/86; 425/384; 425/392; 425/404; 425/445
[58] Field of Search .................. 425/71, 86, 384, 392, 425/404, 445, 70, 72 R; 264/174, 236, 347

[56] References Cited

U.S. PATENT DOCUMENTS

| | | | |
|---|---|---|---|
| 3,846,528 | 11/1974 | Chinsman et al. | 264/174 |
| 3,859,247 | 1/1975 | MacKenzie, Jr. | 264/174 |
| 4,029,450 | 6/1977 | Caser | 425/71 |

*Primary Examiner*—James B. Lowe
*Attorney, Agent, or Firm*—George B. Oujevolk

[57] ABSTRACT

A vulcanization apparatus for a continuous length of article comprises a curved vulcanizing pipe devised to ensure, with the aid of a heating liquid medium recirculation system assembled thereto, a stable and even vulcanization of such a continuous length of article without damaging the same, a tubular cleaner for removing the heating liquid medium deposited on said continuous length of article and a cooling pipe, said vulcanizing pipe, tubular cleaner and cooling pipe being connected together in the cited sequence, without a provision of any spacious separating means or sealing means therebetween, in an arrangement in which a mutual ingression between the heating liquid and cleaning and/or cooling medium can be prevented from and in which the economy can be improved in cost as well as in space while ensuring safety.

16 Claims, 6 Drawing Figures

VULCANIZATION APPARATUS FOR A CONTINUOUS LENGTH OF ARTICLE OF RUBBER, PLASTICS OR THE LIKE MATERIAL

The present invention relates to an apparatus for processing a continuous length of unvulcanized rubber, plastics or the like material into its vulcanized state, for example, a vulcanization apparatus for electric cables or wires, etc. having their conductors constituting the core coated with rubber or plastics constituting their insulation coating and, more specifically, to an improvement of such an apparatus that comprises a means for vulcanizing the aforesaid type of continuous length of articles with a high-temperature heating liquid medium under pressure, a means for cleaning the thus vulcanized continuous length of articles, and a means for cooling the thus cleaned continuous length of articles.

An object of the present invention is to ensure a safety of the vulcanization apparatus in vulcanizing the aforementioned type of continuous length of articles by the liquid curing medium (LCM) method.

Another object of the present invention is to improve the quality of the aforementioned type of products (in continuous lengths).

Yet another object of the present invention is to ensure a retained stable function of the vulcanization apparatus.

A further object of the present invention is to ensure an improved economy of the vulcanization apparatus.

In the LCM method, if the curing medium comprises a molten salt such as eutectic mixture of potassium nitrate, ($KNO_3$), sodium nitrate ($NaNO_2$) or sodium nitrate ($NaNO_3$), a metal bath of low-boiling point metal such as lead, tin or bismuth, or a silicone oil, a relatively high vulcanizing temperature of around 250° C. can be easily attained in a stable state. Under these conditions, if a pair of a continuous length of article to be vulcanized comprises, for example, an elastomeric material such as natural rubber, styrene-butadiene copolymer, polychloroprene, or polyethylene, its vulcanization will be efficiently effected at the aforementioned stable high temperature.

Also, if the inside of the vulcanizing pipe containing the aforementioned curing medium is under a constant pressure, the inside of the continuous length of articles will be free from the formation of voids which may cause dielectric breakdown and, therefore, the quality of the products will be remarkably improved.

However, in the aforementioned type of vulcanization system, the heating liquid medium for vulcanization deposited on the surface of the continuous length of article must be removed by cleaning after the vulcanization and the pressurized cooling of said continuous length of article is naturally required. Therefore, if said cleaning and cooling steps are to be combined with the aforementioned vulcanization process in terms of equipment, there arises a problem in respects of its safety.

That is to say, should the cleaning or cooling liquid be accidentally mixed into the heating liquid medium at a high temperature, a fierce thermal reaction will occur in the vulcanizing pipe containing said heating liquid medium and, in its extremest case, the equipment may burst or explode.

Generally adopted as a means for solving such a problem as mentioned above is a sealing mechanism for preventing a mutual ingression between the heating liquid medium and the cleaning and cooling liquids interposed between the vulcanizing mechanism and the cleaning and cooling mechanisms. However, a very tight sealing mechanism not only remarkably increases the equipment cost, but also decreases the workability with its relatively limited durability and, therefore, such a very tight sealing mechanism cannot be a safety device which is usuable over a long period of time.

As an alternative safety measure thereto, for example (Caser. U.S. Pat. No. 4,029,450) the vulcanization mechanism is sometimes provided separately from the cleaning and cooling mechanisms in such a manner that a large separating space under normal pressure is placed between the vulcanization side and the cleaning and cooling step side. However, in such an alternative measure, the provision of such a large sparating space also gives rise to several problems in that a larger space is consumed for the installation of the overall equipment and the continuous length of article exposed to a normal pressure before being cooled undergo foaming or expansion, in addition to that, in the separating space, the vulcanized continuous length of article is exposed to the atmosphere to cause the heating liquid medium deposited thereon to be cured or any pollutants (dusts) born in the air to be deposited thereon, consequently to render difficult the subsequent cleaning operation.

As mentioned previously, the first object of the present invention is to ensure a safety of the vulcanization apparatus, but the safety means therefor must be free from the aforementioned problems peculiar to the prior art systems.

According to the present invention, to achieve the aforementioned first object, a curved vulcanizing pipe having its inlet and outlet portions disposed at elevated positions of substantially the same height and having its curved central bottom portion disposed at a position lower than said inlet and outlet portions, a downwardly inclined tubular cleaner and a cooling pipe which is also inclined downwardly are used in such a manner that these tubular units are coupled substantially in the horizontal direction in the sequence starting from the vulcanizing pipe through tubular cleaner to the cooling pipe.

When the heating liquid medium is charged in the aforesaid vulcanizing pipe, a liquid surface of the heating medium appears on the inlet and outlet sides of said vulcanizing pipe, respectively. Since these two liquid surfaces are set at a height sufficiently lower than that of the end openings of said inlet and outlet portions of the vulcanizing pipe and the inside of the vulcanizing pipe is pressurized to force down said two liquid surfaces, the heating liquid medium in the vulcanizing pipe is prevented from flowing into the tubular cleaner or cooling pipe beyond the end opening of the outlet portion of the vulcanizing pipe which is at a sufficiently higher altitude than said liquid surface, even if a sealing mechanism is not provided, for example, at the outlet portion of the vulcanizing pipe.

Also, since the tubular cleaner is inclined downwardly from the outlet portion of the vulcanizing pipe, the cleaning liquid therein is prevented from going upstream towards the vulcanizing pipe side. That is to say, the cleaning liquid is prevented from flowing into the vulcanizing pipe.

Further, the aforementioned cooling pipe is also inclined downwardly, similarly to the tubular cleaner, and has its inlet portion disposed at a position lower than the outlet portion of the vulcanizing pipe. Also, the surface of the cooling liquid in the cooling pipe is set at a position sufficiently lower than the end opening of the inlet portion of the cooling pipe, and the cooling pipe is provided with an auxiliary tank for stabilizing the liquid level therein. Therefore, the cooling liquid in the cooling pipe is prevented from going upstream through the tubular cleaner into the vulcanizing pipe. Further, in order to completely prevent a so-called "backward flow", a reservoir is provided at the inlet portion of the cooling pipe for receiving the cleaning liquid overflowing said inlet portion of the cooling pipe.

As understood from the foregoing description, the first object of the present invention can be achieved by preventing the heating liquid medium from flowing in any disadvantageous directions other than their predetermined directions, respectively, without using a sealing mechanism or at best by using a very simple sealing mechanism. Therefore, not only the fourth object of the present invention, namely, an economical advantage can be achieved as well, but also the necessity of an elongated equipment can be eliminated because the vulcanizing pipe, tubular cleaner and cooling pipe are coupled directly from one to another in the cited sequence.

Also, the continuous length of article passing through these tubular structures of the equipment does not come into contact with the air until it completes the final process of cooling, it is neither polluted with air nor undergoes foaming or expansion. Therefore, the second object of the present invention can be achieved. That is to say, a high quality can be ensured for the products. In addition, the washing process of the continuous length of article can be facilitated due to absence of pollutions to be caused by the air.

As mentioned previously, the second object of the present invention is to improve the quality of the continuous length of articles.

The continuous length of article entering the vulcanizing pipe may float up therein to come into contact with the upper internal wall surface of the vulcanizing pipe, because the specific gravity of the continuous length of article is often smaller than that of the heating liquid medium.

The most part of the continuous length of article immediately after entering the vulcanizing pipe is in its unvulcanized state without even a slightest skin cure. If the continuous length of article under such conditions comes into contact with the internal surface of the vulcanizing pipe, the continuous length of article may have its surface damaged or crushed.

On the contrary, if the continuous length of article comes into contact with the internal surface of the vulcanizing pipe after having its surface skin-cured, it will not be susceptible to damage or crushing, because the skin cure itself is made of a tougher vulcanized layer.

Therefore, it will be necessary to devise an arrangement in which the continuous length of article does not come into contact with the internal surface of the vulcanizing pipe until a skin cure is formed in the surface of the continuous length of article. For this purpose, a provision of hold-down rollers inside the vulcanizing pipe may be proposed, for example. However, even if such hold-down rollers are used to prevent a portion of the continuous length of article without skin cure from floating up to come into contact with the inner surface of the vulcanizing pipe, such a portion of the continuous length of article before being skin-cured will be damaged by the hold-down rollers, although it can be kept apart from the inner surface of the vulcanizing pipe.

According to the present invention, roller for preventing the continuous length of article from floating up are provided in the vulcanizing pipe at positions behind a position where the skin cure is formed in the surface of the continuous length of article. Therefore, said rollers only contact a portion of the continuous length of article having at least a skin cure so as to prevent the portion thereof before being cured from coming into contact with the inner surface of the vulcanizing pipe. Thus, the second object of the present invention stated previously can be achieved.

As mentioned previously, the third object of the present invention is to ensure a retained stability of the equipment function and, more specifically, to ensure a stability in the vulcanization processing of the continuous length of article in the vulcanization apparatus, controlling over the temperature of heating liquid medium and replenishment of the heating liquid medium.

In this respect, it is necessary to agitate the heating liquid medium contained in the vulcanizing pipe by an appropriate means so that the heating liquid medium therein shows an even temperature distribution to avoid uneven vulcanization of the continuous length of article.

In general, such an agitation is effected by providing the vulcanizing pipe with a recirculation system having a pump. However, if such a pump is disposed at a position to be cooled with the air, the heating liquid medium may be cured in the pump and its recirculation may be obstructed thereby. Therefore, since the pump must be continually heated by means of an appropriate heater, the equipment and maintenance costs therefor increase substantially.

According to the present invention, a recirculation tank is provided in a recirculation system for receiving a portion of the heating liquid medium and a pump is provided internally of said recirculation tank so that a recirculation occurs in a predetermined manner. Thus, since the pump placed in the recirculation tank is always heated by the heating liquid medium, it can perform a normal driving function. Also, a necessity of uneconomically providing otherwise a heating means for the pump can be eliminated, because the recirculated heating liquid medium is used for heating the same.

In the meantime, the heating liquid medium in the vulcanizing pipe is carried away as being deposited on the surface of the continuous length of article or the heating liquid medium itself may be transmuted into floating draffs or scales and, therefore, the quantity of the heating liquid medium in the vulcanizing pipe gradually decreases. According to the present invention, to make up for this, an additional amount of heating liquid medium is replenished into the vulcanizing pipe from a storage tank with a heater which is provided in the vicinity of the vulcanizing pipe and filled with a certain quantity of the heating liquid medium to meet the aforementioned replenishing requirement.

While, a pump provided in a piping for replenishing the heating liquid medium from the storage tank into the vulcanizing pipe will give rise to a similar problem to that discussed previously in the case of the pump in the recirculation system, if it is disposed at a position to be cooled by the air. Therefore, such a pump for replenishment must also be subjected to a heat-retaining control.

In this case, the temperature of such a replenishing pump may be retained by immersing the same in the storage tank containing the heating liquid medium. However, since the liquid level of the storage tank is gradually lowered as the heating liquid medium therein is replenished into the vulcanizing pipe, the pump may be finally exposed to the atmospheric air.

According to the present invention, to provide against such a situation, the aforementioned storage tank is divided into a pump heating chamber and a heating liquid medium storage chamber, and said pump heating chamber is filled with a constant amount of heating liquid medium so that the pump is always kept immersed therein completely and can feed the heating liquid medium from the adjacent storage chamber into the vulcanizing pipe. Thus, the replenishing pump can also perform a normal driving function continually.

As mentioned previously, the fourth object of the present invention is to ensure an improved economy of the equipment used. This object is already achieved partially in that no sealing mechanism is required for achieving the aforementioned first object of the present invention and that no additional heating means for pumps is required for achieving the third object of the present invention.

Further, according to the present invention, the economy is improved in terms of equipment in that the curved vulcanizing pipe is not formed as a catenary type in its entirety, but only that portion defined between the inlet portion and curved bottom portion thereof is constructed in a catenary form. That is to say, since a vulcanizing pipe of catenary type is more difficult to make and couple than ordinary straight pipe, the economy can be more improved as the number of size of parts of catenary type are reduced.

The reason why the vulcanizing pipe must be constructed in a catenary form is that it is required for preventing the continuous length of article from coming into contact with the internal surface of the vulcanizing pipe. However, according to the present invention, rollers are provided in the vulcanizing pipe at suitable positions to achieve the second object of the present invention, so that the continuous length of article can be prevented from being damaged due to such a contact with the internal surface of the vulcanizing pipe. Therefore, the catenary portion of the vulcanizing pipe can be reduced to at least a half of the length of conventional vulcanizing apparatus and, thus, the economy can be improved by constructing the remaining half portion as an inclined straight pipe which is much inexpensive.

Besides the foregoings, the present invention has its object to protect the vulcanizing pipe from an effect of heat.

That is to say, an expansion joint is provided at the inlet and outlet portions of the vulcanizing pipe, respectively, to absorb a thermal expansion or shrinkage of the vulcanizing pipe that may cause a deformation of the latter.

Further, according to the present invention, a wiping member is provided at the outlet portion of the vulcanizing pipe for minimizing the amount of the heating liquid medium to be carried away as being deposited on the surface of the continuous length of article. In other words, the wiping member is useful for reducing the quantity of the heating liquid medium deposited on the continuous length of article and carried away therewith so as to minimize the rate of decrease in the liquid level of the vulcanizing pipe as well as for facilitating the cleaning of the surface of the continuous length of article.

These and other objects and features of the present invention will be fully understood from the following description of the preferred embodiment of the present invention as read with reference to the accompanying drawings, in which.

Figure 1:
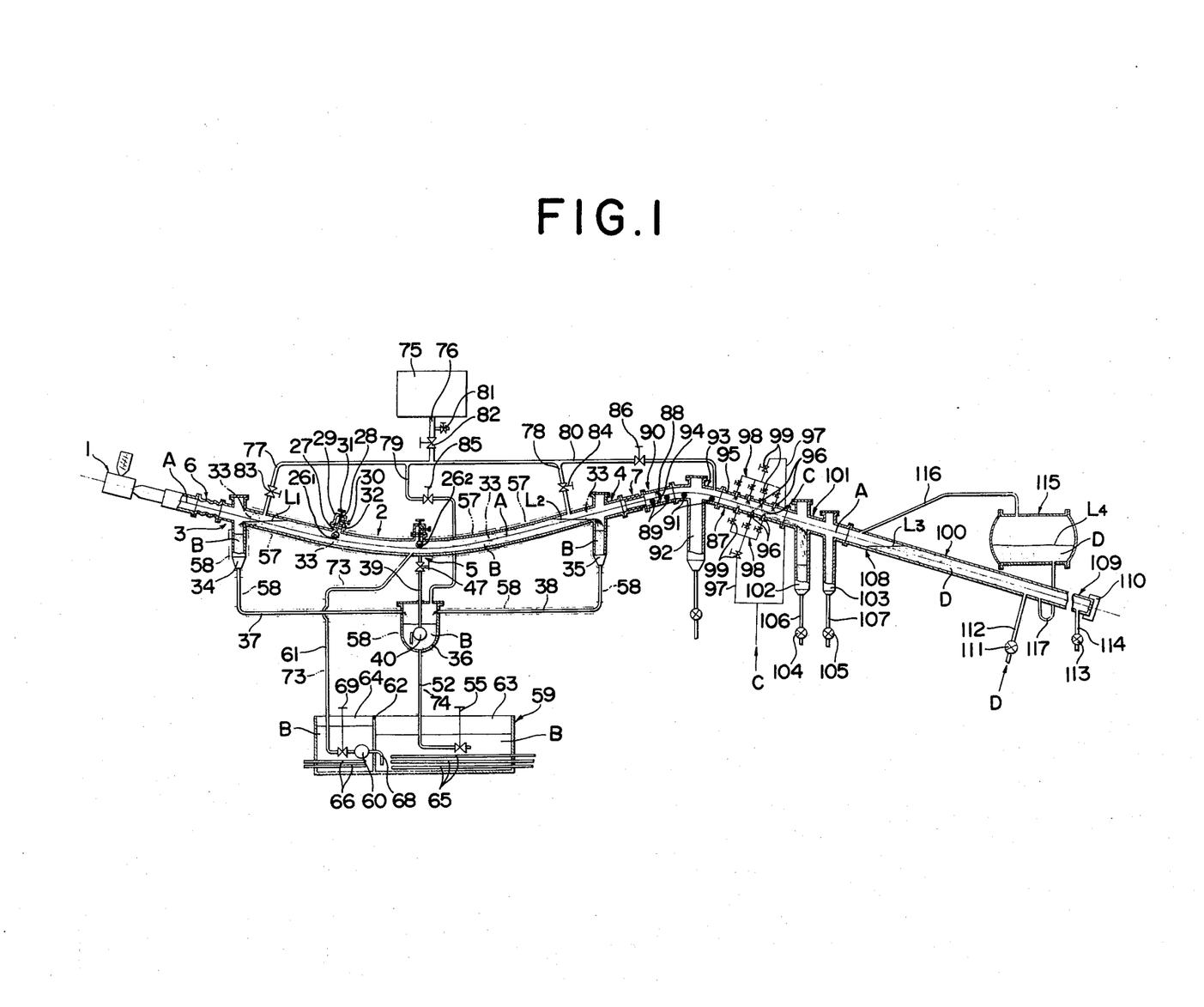
FIG. 1 is a general view of a preferred embodiment of the vulcanization apparatus according to the present invention as applied to the manufacture of electric cables or wires, with a vulcanizing pipe, tubular cleaner, cooling pipe, vulcanizing liquid medium recirculation system and vulcanizing liquid medium feeding device thereof being shown in section.

Referring now to the drawings, especially to FIG. 1, the reference numeral 1 indicates an extruder of a well-known type having only its crosshead portion shown on the drawing. The extruder 1 is arranged so as to provide a cable core fed thereinto with a coating of unvulcanized rubber, plastic or the like material and to extrude the resultant unvulcanized electric cable, namely, a continuous length of article A through its extrusion opening.

The reference numeral 2 indicates a vulcanizing pipe of metal which takes in the unvulcanized continuous length of article extruded from said extruder 1 to vulcanize the same therein. The vulcanizing pipe 2 is filled with a heating liquid medium B such as the eutectic mixture of potassium nitrate ($KNO_3$), sodium nitrite ($NaNO_2$) or sodium nitrate ($NaNO_3$) heated to about 250° C.

The vulcanizing pipe 2 has its inlet portion 3 and outlet portion 4 disposed at elevated positions of substantially the same height and has its central bottom portion 5 curved and disposed at a position lower than said inlet and outlet portions 3, 4.

Also, said vulcanizing pipe 2 has its portion between said inlet portion 3 and curved bottom portion 5 constructed in a catenary form and has its other portion between said curved bottom portion 5 and outlet portion 4 constructed in an inclined straight pipe. The vulcanizing pipe 2 may comprises one single pipe of integral structure as shown in FIG. 1, but it is generally composed of a plurality of short pipe sections connected together so as to form the aforementioned curved shape.

To the outlet portion 3 of said vulcanizing pipe 2, an expansion joint 6 of bellows type is coupled. While, an expansion joint 7 of a splice type is coupled to its outlet portion 4. These expansion joints 6 and 7 function to absorb a thermal expansion or shrinkage of the vulcanizing pipe 2.

Figure 2:
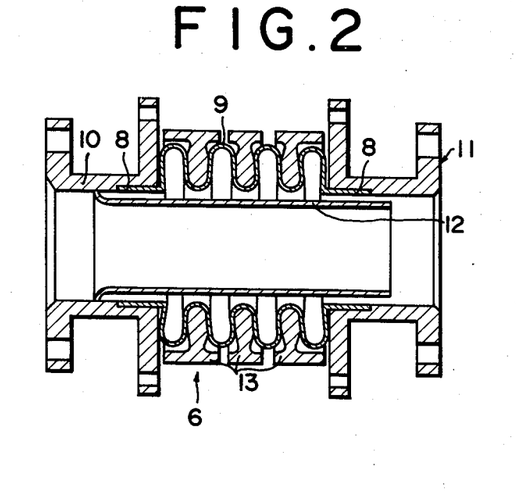
FIGS. 2 and 3 are enlarged sections of an expansion joint, respectively, used as a component members of the vulcanizing pipe shown in FIG. 1, with FIG. 2 showing an expansion joint of bellows type and FIG. 3 showing an expansion joint of splice type.

As shown in FIG. 2, the expansion joint of bellows type 6 has a pair of flanges 10, 11 of metal at the opposite ends 8, 8 of a freely expansible bellows 9 made of heat resisting rubber, synthetic resin or metal such as aluminium, stainless steel or the like. In said bellows 9 is inserted a bush 12 of metal extending substantially between said opposite flanges 10 and 11 and having one end thereof secured by welding or other suitable means to the flange 10. Said metal bush 12 is provided for preventing the heating liquid medium B from depositing on the bellows 9. Also, a plurality of reinforcing rings 13 of metal are circumferentially fitted onto the outside of the bellows 9. The expansion joint 6 having the aforementioned structure permits the opposite flange 10 and 11 to move axially as the bellows expands or contracts. Therefore, if the expansion joint 6 is provided at the position shown in FIG. 1, it can absorb the thermal expansion and shrinkage of the vulcanizing pipe 2 at the inlet portion 3 of the vulcanizing pipe 2, because the bellows 9 can freely expand or contract in a certain stroke allowed for it.

Figure 3:
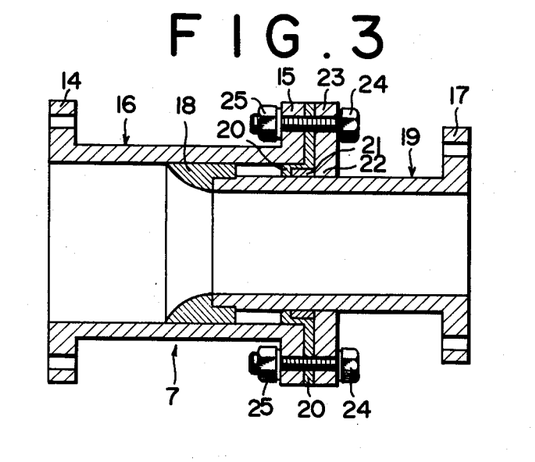

While, as shown in FIG. 3, the expansion joint 7 of splice type is composed of an external cylinder 16 of metal having flanges 14 and 15 at its opposite ends, an internal cylinder 19 of metal provided at one end thereof with a flange 17 and at other end thereof with a slidable packing 18 of heat and wear resisting rubber, a seal packing 21 of rubber, synthetic resin or soft metal retained by a packing holder 20 or metal, and a flange plate 23 of metal having a fitting hole 22. The external cylinder 16 is fitted onto the internal cylinder 19 in such a manner that the slidable packing 18 is in contact with the inner circumferential surface of the external cylinder 16. The seal packing 21 retained by the packing holder 20 and the flange plate 23 are fitted onto the outer circumferential surface of the internal cylinder 19. The packing holder 20 is interposed between the flange 15 and the flange plate 23 and securely tightened thereat by means of bolts 24 and nuts 25. The expansion joint 7 having the aforementioned structure permits its external cylinder 16 and internal cylinder 19 to move relatively to each other in the axial direction with the slidable packing 18 being kept in contact with the inner circumferential surface of the external cylinder 16. Thus, if the expansion joint 7 is provided at the position shown in FIG. 1, the thermal expansion and shrinkage of the vulcanizing pipe 2 can be absorbed at its outlet portion 4 by said external cylinder 16 and internal cylinder 19 which are axially movable relatively to each other.

In this connection, the expansion joint 7 at the outlet portion 4 of the vulcanizing pipe may be substituted by other expansion joint of bellows type identical to the expansion joint 6.

However, as far as the expansion joint 6 at the inlet portion 3 of the vulcanizing pipe 2 is concerned, it is preferable to use one of the bellows type, because this type of exapnsion joint can absorb the thermal expansion and shrinkage of the catenary portion of the vulcanizing pipe without any unreasonable strain.

Although these expansion joints 6 and 7 may be provided at any desired positions on the vulcanizing pipe 2, a consideration for the fluid-tightness of the vulcanizing pipe 2 will result, as a matter of course, in the selection of the positions shown on the drawings as the best-suited locations for said expansion joints 6 and 7.

Further, inside said vulcanizing pipe 2, are provided hold-down rollers $(26)_1$ and $(26)_2$ for preventing the continuous length of article A from floating up, namely, from coming into contact with and being damaged by the upper circumferential surface of the vulcanizing pipe 2.

As shown in FIG. 1, said hold-down roller $(26)_1$ is provided in the vulcanizing pipe 2 insertedly through an opening 27 opened at the upper side of the vulcanizing pipe 2. Also, the roller $(26)_1$ which is made of metal is freely rotatably mounted to the lower end of a metal rod 28 by a well-known means. Said rod 28 penetrates a cylindrical cover 29 of metal seated onto said opening 27 and is supported vertically movably by said cover 29. Thus, by vertically adjusting the rod 28, the roller $(26)_1$ can be brought into contact with the continuous length of article A at a desired vertical position in the vulcanizing pipe 2. The position of the thus adjusted roller $(26)_1$ can be held by means of a set-screw 30 which is screwed from the outside of the cover 29 into the inside thereof to be securely rested against the rod 28.

A knob 31 is provided onto the top end of said rod 28 for facilitating the verical adjustment operation of the same and, to ensure the gas and liquid tightness of the vulcanizing pipe 2, a heat resisting sealing member 32 of rubber or synthetic resin is placed in the space defined by said opening 27 and said cover 29.

It is to be noted that since the other roller $(26)_2$ is also provided in the vulcanizing pipe 2 in almost the same manner as the first roller $(26)_1$, a detailed description thereof may be omitted.

In providing the aforementioned hold-down rollers $(26)_1$ and $(26)_2$ in the vulcanizing pipe, their positioning has a very significant meaning for the effect of the present invention.

That is to say, the continuous length of article A immediately after entering the vulcanization pipe is hardly vulcanized and even a skin cure is not yet formed therein. Therefore, if the rollers $(26)_1$ and $(26)_2$ are brought into contact with the continuous length of article in such an unvulcanized state, the rollers $(26)_1$ and $(26)_2$, rather than the inner surface of the vulcanizing pipe 2, may scratch or otherwise damage the continuous length of article A.

Therefore, according to the present invention, the first hold-down roller $(26)_1$ is positioned at a point in the vulcanizing pipe 2 where at least a skin cure is formed in the continuous length of article A. While, the second hold-down roller $(26)_2$ may be positioned at any point behind the first roller $(26)_1$, for example, in the vicinity of the curved bottom portion 5 of the vulcanizing pipe 2 as shown in FIG. 1.

Although an additional number of such hold-down rollers may be provided in the vulcanizing pipe 2, as required, it goes without saying that the positions of such additional rollers must be selected to suitable points where the continuous length of article A is not damaged thereby.

The vulcanizing pipe 2 is provided with a plurality of sight-through windows 33 for permitting an internal inspection, for example, at such positions as indicated by the two-dot chain line circles in FIG. 1.

Although the details of these sight-through windows 33 are not shown in the drawings, each of these windows 33 may comprise, for example, a heat and pressure resisting transparent sheet of glass or synthetic resin fitted by means of a seal packing into an opening provided in the lateral face of the vulcanizing pipe 2.

Figure 4:
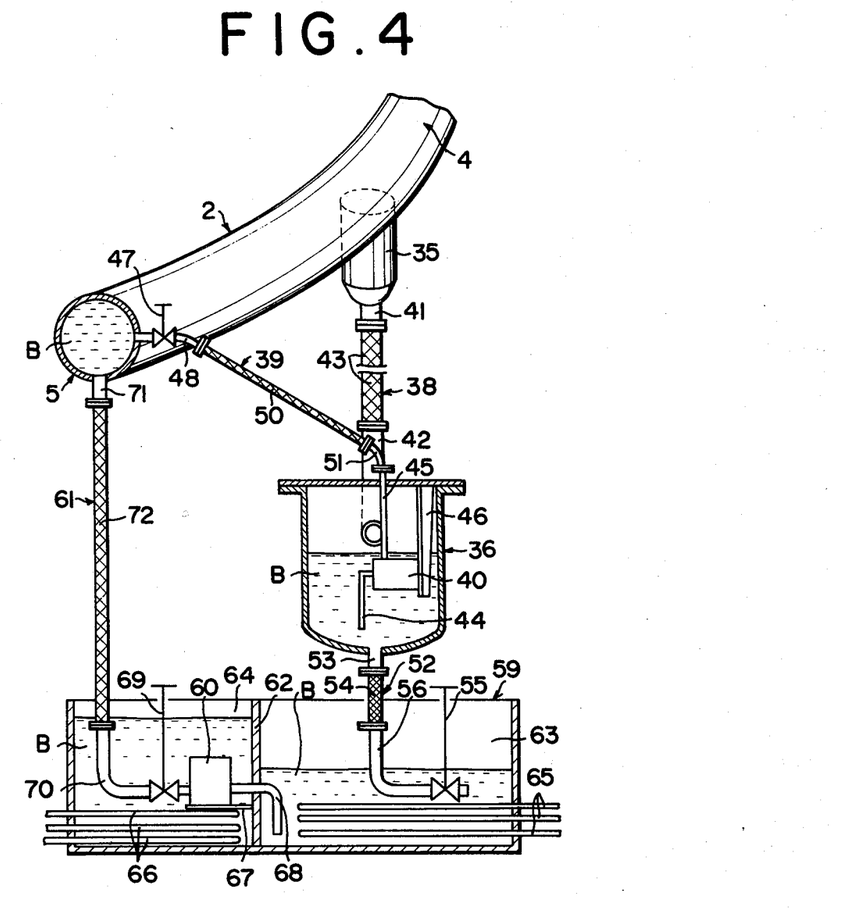
FIG. 4 is an enlarged view of the vulcanizing liquid medium recirculation system and the vulcanizing liquid medium feeding device shown in FIG. 1, showing the details thereof in section.

Further, the vulcanizing pipe 2 is provided with a recirculation system for recirculating the heating liquid medium in the vulcanizing pipe 2, as shown in FIG. 1 and in greater detail in FIG. 4.

The recirculation system is composed of overflow reservoirs 34 and 35 each provided at the underside of the inlet portion 3 and outlet portion 4 of the vulcanizing pipe 2, a recirculation tank 36 provided below the curved bottom portion 5 of the vulcanizing pipe 2, and conduits 37, 38 and 39 connected from the overflow reservoirs 34 and 35 to the recirculation tank 36 and from the recirculation tank 36 to the vulcanizing pipe 2, respectively.

In the inlet portion 3 and outlet portion 4 of the vulcanizing pipe, there exist liquid surfaces $L_1$ and $L_2$ of the heating liquid medium B, respectively. If these liquid surfaces $L_1$ and $L_2$ become higher than a predetermined level, the heating liquid medium B overflows into the overflow reservoirs 34 and 35, respectively, and the heating liquid medium B thus flowing thereinto is then flows through the conduits 37 and 38, respectively, into the recirculation tank 36.

Further, the heating liquid medium B thus flowing into the recirculation tank 36 is fed through the conduit 39 having a pump 40 therein into the vulcanizing pipe 2 from its curved bottom portion 5 to again raise the liquid levels at $L_1$ and $L_2$ in the vulcanizing pipe 2. Then, the aforementioned sequence is repeated and the heating liquid medium B in the vulcanizing pipe 2 is kept continually recirculated.

Since the heating liquid medium B in said vulcanizing pipe 2 is kept recirculated, a uniform temperature distribution is ensured in the vulcanizing pipe 2 over its entirety and, therefore, the continuous length of article passing through the vulcanizing pipe 2 can be prevented from being unevenly vulcanized therein.

In this case, the vulcanizing pipe 2 and the recirculation tank 36 are filled with a sufficient quantity of the heating liquid medium B required for the vulcanization and recirculation and, after the recirculation is started once, said required quantity of the heating liquid medium B is efficiently utilized as being retained at a temperature required for the vulcanization by a suitable means to be described later.

The aforementioned recirculation system is illustrated in FIG. 4 in greater detail. One overflow reservoir 34 and conduit 37 is omitted from FIG. 4. However, since these overflow reservoir 34 and conduit 37 are identical in construction to the other overflow reservoir 35 and conduit 38, respectively, the following description of the latter overflow reservoir 35 and conduit 38 will be sufficient for the understanding of the former ones.

Referring now to FIG. 4, the overflowing reservoir 35 of the vulcanizing pipe 2 is communicated with the recirculation tank 36 through a flexible metallic tube 43 connected from a connecting port pipe 41 of the overflow reservoir 35 to a connecting pipe 42 of the recirculation tank 36. Said connecting pipes 41 and 42 and said tube 43 constitute said conduit 38 as a whole.

While, inside the recirculation tank 36 made of metal is provided a pump 40 having a suction pipe 44 and discharge pipe 45, suspended from the top plate of the tank 36 by means of a metal bracket 46. The pump 40 has its discharge side communicated with the curved bottom portion 5 of the vulcanizing pipe 2 through the aforesaid conduit 39 composed of the discharge pipe 45 of the pump 40, a bent metal pipe 51, the flexible metallic tube 50 and connecting pipe 48 with a valve 47 provided on the front side of the curved bottom portion 5 of the vulcanizing pipe 2.

Further, on the underside of the recirculation tank 36, provided is a conduit 52 for draining the heating liquid medium contained therein. The conduit 52 is composed of a drain pipe 53, the flexible tube 54 and metal pipe 56 having a valve 55.

In the foregoing arrangement according to the present invention, a heater 57 such as, for example, a band heater is wound around on the outer circumferential surface of vulcanizing pipe 2 for heat-retaining or heating the heating liquid medium contained therein, as indicated by two-dot chain lines. Also, the aforementioned recirculation system for the vulcanizing pipe 2 is wrapped in heat-insulating materials or provided with a heater 58 wound around the same for heat-retaining the heating liquid medium flowing therein.

Also, in the aforementioned arrangement of the present invention, since the pump 40 is immersed in the heating liquid medium contained in the recirculation tank 36, heating or heat-retaining the recirculation tank 36 will simultaneously heat or heat-retain the pump 40.

In vulcanizing the continuous length of article A through the vulcanizing pipe 2 in the aforementioned manner, a portion of the heating liquid medium B contained in the vulcanizing pipe 2 is carried away as being deposited on the continuous length of article A or transmuted into draffs, a fresh liquid medium B must be replenished into the vulcanizing pipe 2 at a suitable timing or regularly in order to compensate for such a decrease in the quantity of the heating liquid medium B.

The feeding device shown in FIGS. 1 and 4 which is used for charging the heating liquid medium B into the vulcanizing pipe 2 prior to starting the vulcanizing operation is also used for the purpose of replenishment as mentioned above.

The aforesaid feeding device is mainly composed of a storage tank 59 made of metal and a feed conduit 61 having a pump 60.

As shown in FIG. 4, the interior of the storage tank 59 is divided by means of a partition wall 62 into a storage chamber 63 for the heating liquid medium B and a heating chamber 64 for the pump 60, and these two chambers 63 and 64 are both filled with the heating liquid medium B.

Also, inside these two chambers 63 and 64, provided are heaters 65 and 66 such as a heating pipe of steam recirculation type or electric heater, respectively, for retaining the heating liquid medium B contained therein at a predetermined temperature.

Further, on the braket 67 provided in the heating chamber 64 is mounted a pump 60 having a suction pipe 68 inserted into the storage chamber 63 and a discharge pipe 70 provided with a valve 69. The discharge side of the pump 60 is communicated with the curved bottom portion 5 of the vulcanizing pipe 2 through the aforesaid feed conduit 61 which is composed of the discharge pipe 70 of said pump 60, a flexible metallic tube 72 and a connecting pipe 71 provided on the underside of the curved bottom portion 5 of the vulcanizing pipe 2.

Thus, as the pump 60 is driven, the heating liquid medium B contained in the storage chamber 63 of the storage tank 59 is fed or replenished through said feed conduit 61 into the vulcanizing pipe 2. In this connection, since the pump 60 is always heat-retained by the heating liquid medium B contained in the heating chamber 64, it can be immediately actuated, upon required.

Further, as shown in FIG. 1, a heat-insulating material or a heater 73 is also wrapped or wound around the feed conduit 61 for the heat-retaining or heating purpose.

The draining flow passage piping 52 of the aforementioned recirculation tank 36 has its lower end disposed inside the storage chamber 63 of the storage tank 59, and a heat-insulating material or a heater 74 is wrapped or wound around said flow passage piping 52.

Next, when the continuous length of article A is vulcanized in the vulcanizing pipe 2, the inside of the vulcanizing pipe 2 is kept under pressure.

That is to say, if the continuous length of article A is vulcanized under pressure in the vulcanizing pipe 2, a vulcanized product of improved quality can be obtained without a formation of voids in the continuous length of article A. Also, in this case, since the liquid surfaces in the vulcanizing pipe 2 is forced down by the action of pressure, the heating liquid medium A contained therein can be prevented from flowing into the section of a tubular cleaner or cooling pipe to be described later.

Referring again to FIG. 1, a gas tank 75 filled with an inert gas such as nitrogen or argon gas is provided with a main pipe 76 and a pressurized gas feeding system composed of gas pipes 77, 78, 79 and 80 which are branched from said main pipe 76. The main pipe 76 in provided with a safety valve 81 and a main cock 82, and said gas pipes 77, 78, 79, and 80 are provided with valves 83, 84, 85 and 86, respectively.

The gas pipes 77 and 78 are connected to the upper side of the inlet portion 3 and outlet portion 4 of the vulcanizing pipe 2, respectively, to pressurize the inside of the vulcanizing pipe 2 by gas so that the liquid surfaces $L_1$ and $L_2$ of the heating liquid medium B contained therein are placed substantially in the same level and, at the same time, to force down said liquid surfaces $L_1$ and $L_2$ by the action of gas pressure.

In the meantime, another gas pipe 79 is connected to the recirculation tank 36 to hold the balance of pressure between the vulcanizing pipe 2 and recirculation tank 36. While, the remaining gas pipe 80 is connected to the tubular cleaner section to be described later.

According to the present invention, as mentioned hereinabove, the heating liquid medium B contained in the vulcanizing pipe 2 is recirculated through the recirculation system having therein the recirculation tank 36 of relatively small size. Therefore, as compared with a conventional system which would be arranged so as to recirculate the heating liquid medium directly through the storage tank 59 of relatively large size and the vulcanizing pipe 2, the entire equipment can be remarkably simplified according to the present invention with an accompanying reduction in the quantity of the heating liquid medium B used therein, to the economical advantage in that only the recirculation tank 36 of relatively small size is required to be pressurized without a necessity of pressuring the storage tank 59 of relatively large size.

The continuous length of article A vulcanized under pressure in the aforementioned manner passes through the outlet portion 4 of the vulcanizing pipe to enter a tubular cleaner 87. However, according to the present invention, to the rear end of the expansion joint 7 shown in FIG. 1 is coupled a metal pipe 90 provided therein with a conically-shaped wiping member 88 of heat and wear resisting cloth, rubber or synthetic resin and a guide roller 89. Further, to the rear end of said metal pipe 90 is coupled another metal pipe 93 provided therein with a guide roller 91 and on the underside thereof with a reservoir 92. Thus, the continuous length of article A vulcanized under pressure enters the tubular cleaner 89 after passing through said two metal pipes 90 and 93 which are connected serially.

The aforesaid conically-shaped wiping member 88 provided in said pipe 90 has at its center portion a through-hole 94 of such a diameter that the external surface of the continuous length of article A passes therethrough in contact with the inner circumference thereof. Thus, since the continuous length of article A passes through said through-hole 94 in contact with its inner circumference, a substantial part of the heating liquid medium B deposited on the continuous length of article A will be removed by said wiping member 88 which is in contact with the external surface of said continuous length of article A, so that the ingress of the heating liquid medium B deposited on the continuous length of article from the vulcanizing pipe 2 into the tubular cleaner 87 can be substantially prevented.

Consequently, not only the heating liquid medium B can be prevented from decreasing at a faster rate, but also the time and labor consumed for cleaning the continuous length of article A can be minimized.

As shown in FIG. 1, the pipe 93 is disposed at the boundary position between the outlet portion 4 of the vulcanizing pipe 2 and the tubular cleaner 87. Also, the aforementioned gas pipe 80 is connected to this pipe 93.

The tubular cleaner 87 connected to the pipe 93 has its tubular body 95 of metal inclined downwardly from said pipe 93 and is provided with a plurality of cleaning liquid injection nozzles 96 which are projected from the outside into the inside of the tubular body 95. To said respective injection nozzles 95, a cleaning liquid feed conduit 97 having its end portions divided into the same plural number of branch pipes 98 as said injection nozzles is connected through said branch pipes 98.

In FIG. 1 the reference numeral 99 indicates a valve provided in each of said feed conduit 97 and branch pipes. The feed conduit 97 is connected from a suitable cleaning liquid storage tank which is not shown.

Figure 5:
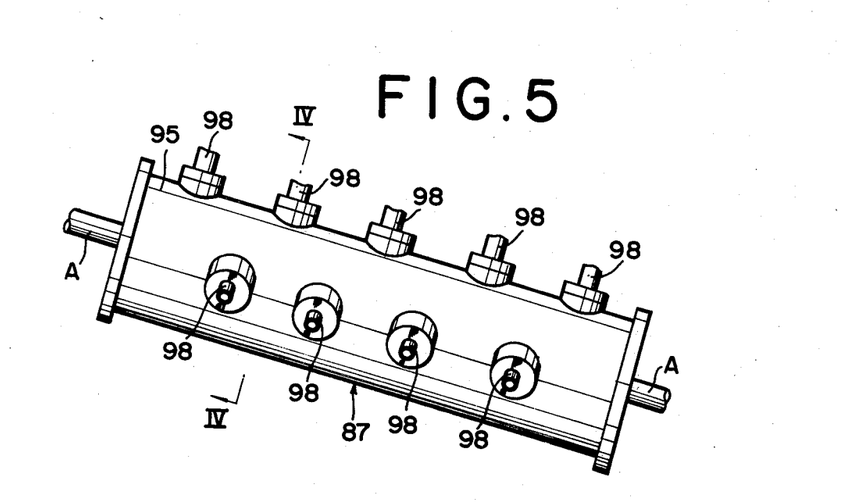
FIG. 5 is an enlarged front view of the tubular cleaner shown in FIG. 1.
Figure 6:
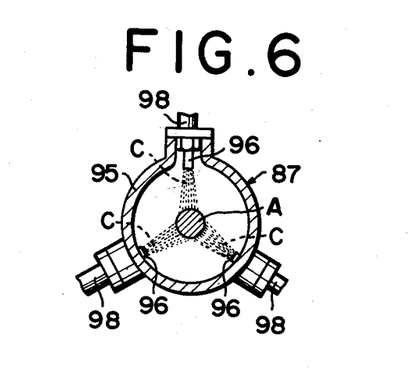
FIG. 6 is a cross section taken on the line VI—VI of FIG. 5.

Referring now to FIGS. 5 and 6 in which the tubular cleaner is shown in greater detail and in more specific manner, these injection nozzles 96 are disposed at a suitable pitch in three longitudinal rows which are angularly spaced apart by 120° from one another in such a manner that the axis of the nozzles 96 in one row intersects the axes of those in other two rows on the center line of the tubular body 95 as viewed in the cross section of the tubular body 95. Further, each injection nozzle 96 in the upper one row is shifted by half a pitch from each nozzle in the lower two rows.

If the continuous length of article after being vulcanized under pressure enters the tubular cleaner 87 having the aforementioned construction, the cleaning liquid C is injected from each nozzle 96 towards the continuous length of article A, and the heating liquid medium B comprising, for example, a molten salt deposted on the continuous length of article will be washed off with said cleaning liquid C comprising a warm water at the about 30–80° C.

In this case, since the tubular cleaner 87 is inclined downwardly towards the exit side of the apparatus, the cleaning liquid C or its waste liquid is prevented from going upstream towards the elevated outlet portion 4 of the vulcanizing pipe 2 to accidentally flow thereinto.

Further, since the reservoir 92 is provided at a position between the outlet portion 4 of the vulcanizing pipe 2 and the tubular cleaner 87, any part of the liquid in the tubular cleaner 87 flowing backward toward the side of the vulcanizing pipe 2 will be entrapped into the reservoir 92. This also prevents accidental intrusion of the cleaning liquid C into the vulcanizing pipe 2.

As clearly seen from FIG. 1, the thus cleaned continuous length of article goes into a cooling pipe 100 through a forwardly downwardly inclined metal pipe 101 which is interposed between the tubular cleaner 87 and said cooling pipe 100.

On the underside of said metal pipe 101, there are provided two reservoirs 102 and 103. The first reservoir 102 is used to receive the cleaning waste liquid from the aforementioned cleaning operation. While, the second reservoir 103 entraps a part of the cooling liquid D overflowing the cooling pipe 100, if any.

These two reservoirs 102 and 103 are provided, respectively, with drain pipes 106 and 107 having valves 104 and 105, respectively. Thus, the cleaning waste liquid from the preceding cleaning operation flows into the reservoir 102 and, then, is discharged therefrom through the drain pipe 106 and valve 104. Also, any part of the cooling liquid D overflowing the cooling pipe 100 is entrapped into the reservoir 103 and, then, discharged therefrom through the drain pipe 107 and valve 105.

The cooling pipe 100 made of metal shown in FIG. 1 has its inlet portion 108 coupled to the aforesaid pipe 101 and is inclined downwardly towards its outlet portion 109 which is provided with an end seal of a well-known construction.

Further, the cooling pipe 100 is provided with a feed pipe 112 having a valve 111 and a pipe 114 having a valve 113 which are connected to the underside of the cooling pipe 100, respectively.

In the preferred embodiment under consideration, the cooling liquid D comprises water and is supplied under pressure from a suitable cooling liquid tank (not shown) through the aforesaid feed pipe 112 into the cooling pipe 100.

The cooling pipe 100 is disposed in such a manner that the liquid surface $L_3$ of the cooling liquid D to be formed at the inlet portion 108 of the cooling pipe is positioned in a level lower than that of the liquid surfaces $L_1$ and $L_2$ in the vulcanizing pipe 2 described previously. In order to stabilize the liquid surface $L_3$, an auxiliary tank 115 of metal also containing the cooling liquid D is connected through metal communication pipes 116 and 117 to the cooling pipe 100.

One of these two communication pipes, namely, the pipe 116 is connected to communicate the gaseous phase in the upper space formed in the auxiliary tank 115. While, the other communication pipe 117 is connected to communicate the liquid phase in the cooling pipe 100 with the liquid phase in the lower portion of the auxiliary tank 115.

Thus, the liquid surface $L_3$ in the cooling pipe is kept in the same level as the liquid surface $L_4$ in the auxiliary tank 115. Also, the rise and fall of the level of the liquid surface $L_3$ owing to the increase and decrease in the cooling liquid in the cooling pipe 100 can be minimized, because it is absorbed in and mitigated by the auxiliary tank 115.

The continuous length of article A entering the cooling pipe 100 having its liquid level stabilized in the aforementioned manner is cooled by the cooling liquid D therein, and the thus cooled continuous length of article A goes out therefrom through its outlet portion 109 to be wound up on a suitable winding machine which is not shown.

Even if the level of the liquid surface $L_3$ in the cooling pipe 100 abnormally rises to cause the cooling liquid D to overflow past the inlet portion 108 thereof due to some cause during the cooling operation for the continuous length of article A, the cooling liquid D scarcely enter the vulcanizing pipe 2, because such an overflowing liquid is entrapped into the reservoir 103 in almost all cases.

As mentioned previously, the cleaning liquid C is prevented from flowing backwards into the vulcanizing pipe 2 in ordinary cases. Therefore, an accidental intrusion of the cooling liquid D in the cooling pipe 100 flowing upstream into the vulcanizing pipe 2 is less probable than an intrusion of the cleaning liquid C thereinto, because the cooling pipe 100 is positioned in a level lower than the tubular cleaner 87. Thus, it may safely be said that the probability of an accidental explosion of the vulcanizing pipe 2 due to an ingress of the cooling liquid D into the vulcanizing pipe 2 is very close to zero.

As fully understood from the foregoing description, the vulcanizinc allaratus accordinc tk the present invention can fully meet the objects thereof set forth previously in vulcanizing, cleaning and cooling a continuous length of article of rubber, plastics or the like material.

What is claimed is:

1. A vulcanization apparatus for a continuous length of article of rubber, plastics or the like material, comprising a curved vulcanizing pipe having its inlet portion where said continuous length of article enters therein and its outlet portion where said continuous length of article goes out thereof disposed at elevated positions of substantially the same height and having its curved central bottom portion disposed at a position lower than said inlet and outlet portions, said vulcanizing pipe being provided with a recirculation system which causes a heating liquid medium fed into said vulcanizing pipe from said curved bottom portion thereof by means of a feeding device to flow out from the underside of said inlet and outlet portions for recirculation into said vulcanizing pipe from said curved bottom portion, said inlet and outlet portions being each provided with a pressurized gas feeding system which pressurizes the heating liquid medium so that the liquid surfaces at said inlet and outlet portions are on same level, a cooling pipe which is provided on the outlet side of said vulcanizing pipe and which is inclined so that the inlet portion thereof is disposed at a position higher than the outlet portion thereof, and a tubular cleaner for removing the heating liquid medium deposited on the vulcanized continuous length of article which is interposed between said vulcanizing pipe outlet portion and said cooling pipe inlet portion that are both at elevated positions as compared with the position of said outlet portion of said cooling pipe, said vulcanizing pipe, tubular cleaner and cooling pipe being coupled from one to another in this sequence to form the entire vulcanization apparatus.

2. A vulcanization apparatus for a continuous length of article of rubber, plastics or the like material according to claim 1, wherein said curved vulcanizing pipe has the portion thereof between said inlet portion and said curved bottom portion formed in a catenary curve.

3. A vulcanization apparatus for a continuous length of article of rubber, plastics or the like material according to claim 1, wherein said curved vulcanizing pipe has the portion thereof between said curved bottom portion and said outlet portion inclined along a straight line upwardly towards said outlet portion.

4. A vulcanization apparatus for a continuous length of article of rubber, plastics or the like material according to claim 1, wherein an expansion joint is provided each at said inlet and outlet portions of said vulcanizing pipe for absorbing a thermal expansion and shrinkage thereof.

5. A vulcanization apparatus for a continuous length of article of rubber, plastics or the like material according to claim 4, wherein said expansion joint provided at said inlet portion of said vulcanizing pipe is of bellows type and said expansion joint at said outlet portion of the vulcanizing pipe is of splice type.

6. A vulcanization apparatus for a continuous length of article of rubber, plastics or the like material according to claim 4, wherein said expansion joints provided at said inlet and outlet portions of said vulcanizing pipe are of bellows type.

7. A vulcanization apparatus for a continuous length of article of rubber, plastics or the like material according to claim 1, wherein rollers for holding down said continuous length of article are provided in said vulcanizing pipe at positions behind a position where a skin cure is formed in the surface of said continuous length of article of rubber, plastics or the like material.

8. A vulcanization apparatus for a continuous length of article of rubber, plastics or the like material according to claim 1, wherein said recirculation system of the heating liquid medium comprises an overflow reservoir each provided integrally with the underside of said inlet and outlet portions of said vulcanizing pipe, a recirculation tank which is disposed at a position lower than said overflow reservoirs and interconnected with each of said overflow reservoir through a conduit, respectively, and a pump provided internally of said recirculation tank, said pump having the discharge side thereof connected through another conduit to said curved bottom portion of said vulcanizing pipe.

9. A vulcanization apparatus for a continuous length of article of rubber, plastics or the like material according to claim 1, wherein said feeding device for the heating liquid medium comprises a storage tank having the interior thereof divided into a pump heating chamber and a heating liquid medium storage chamber, a heater each provided in said two chambers for heating the heating liquid medium therein, and a feed conduit having a pump disposed in said heating chamber, said feed conduit having one end thereof connected to said curved bottom portion of said vulcanizing pipe and having other end thereof connected and opened to the inside of said storage chamber of said storage tank through said pump disposed in said heating chamber.

10. A vulcanization apparatus for a continuous length of article of rubber, plastics or the like material according to claim 1, wherein said tubular cleaner interposed between said outlet portion of said vulcanizing pipe and said inlet portion of said cooling pipe is provided with a plurality of cleaning liquid injection nozzles opened in the inner surface thereof circumferentially and axially.

11. A vulcanization apparatus for a continuous length of article of rubber, plastics or the like material according to claim 1, wherein said tubular cleaner is downwardly inclined from said outlet portion of said vulcanizing pipe which is at said elevated position towards said inlet portion of said cooling pipe which is at said lower position.

12. A vulcanization apparatus for a continuous length of article of rubber, plastics or the like material according to claim 1, wherein at least one cleaning liquid reservoir is provided at the lower end portion of said inclined tubular cleaner.

13. A vulcanization apparatus for a continuous length of article of rubber, plastics or the like material according to claim 1, wherein an auxiliary cooling liquid tank is connected to said cooling pipe for stabilizing the cooling liquid level therein.

14. A vulcanization apparatus for a continuous length of article of rubber, plastics or the like material according to claim 1, wherein said cooling pipe is provided at the inlet portion thereof with a reservoir for receiving the cooling liquid overflowing said inlet portion due to an increase in the liquid level therein.

15. A vulcanization apparatus for a continuous length of article of rubber, plastics or the like material according to claim 1, wherein said cooling pipe has the inlet portion thereof disposed at a position lower than said outlet portion of said vulcanizing pipe.

16. A vulcanization apparatus for a continuous length of article of rubber, plastics or the like material according to claim 1, wherein a member for wiping the surface of said continuous length of article is provided at said outlet portion of said vulcanizing pipe.

* * * * *